United States Patent
Feng et al.

(10) Patent No.: US 8,719,010 B2
(45) Date of Patent: *May 6, 2014

(54) METHOD AND APPARATUS FOR RESPONDING TO AN INQUIRY

(71) Applicant: AT&T Intellectual Property II, L.P., Atlanta, GA (US)

(72) Inventors: Junlan Feng, Basking Ridge, NJ (US); Mazin Gilbert, Warren, NJ (US); Dilek Hakkani-Tur, Castro Valley, CA (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,616

(22) Filed: Mar. 1, 2013

(65) Prior Publication Data
US 2013/0177893 A1    Jul. 11, 2013

Related U.S. Application Data

(63) Continuation of application No. 11/260,412, filed on Oct. 27, 2005, now Pat. No. 8,412,514.

(51) Int. Cl.
*G06F 17/27* (2006.01)
*G06F 17/21* (2006.01)
*G06F 17/20* (2006.01)

(52) U.S. Cl.
USPC ..................... 704/9; 704/1; 704/10

(58) Field of Classification Search
USPC .......................... 704/1, 9; 707/3, 5
See application file for complete search history.

(56) References Cited

U.S. PATENT DOCUMENTS

| | | | |
|---|---|---|---|
| 6,078,914 A | 6/2000 | Redfern | |
| 6,131,085 A | 10/2000 | Rossides | |
| 6,904,428 B2 | 6/2005 | Frieder et al. | |
| 6,910,003 B1 | 6/2005 | Arnold et al. | |
| 7,475,010 B2 | 1/2009 | Chao | |
| 7,756,887 B1* | 7/2010 | Haveliwala | 707/769 |
| 2002/0085025 A1 | 7/2002 | Busis et al. | |
| 2002/0111934 A1 | 8/2002 | Narayan | |
| 2002/0116176 A1 | 8/2002 | Tsourikov et al. | |
| 2002/0120609 A1 | 8/2002 | Lang et al. | |
| 2003/0225747 A1 | 12/2003 | Brown et al. | |
| 2005/0010605 A1 | 1/2005 | Conrad et al. | |

OTHER PUBLICATIONS www.google.com, downloaded on Oct. 26, 2005, 1 page.
www.allie.att.com, downloaded on Oct. 26, 2005, 1 page.
start.csail.mit.edu, downloaded Oct. 26, 2005; 2 pages.
www.ask.com, downloaded on Oct. 26, 2005; 1 page.
Kulyukin, et al.; "Mining Free Text for Structure", IGI Publishing, Hershey, PA 2003.

* cited by examiner

*Primary Examiner* — Jesse Pullias
(74) *Attorney, Agent, or Firm* — Wolff & Samson, PC

(57) ABSTRACT

Disclosed is a method and apparatus for responding to an inquiry from a client via a network. The method and apparatus receive the inquiry from a client via a network. Based on the inquiry, question-answer pairs retrieved from the network are analyzed to determine a response to the inquiry. The QA pairs are not predefined. As a result, the QA pairs have to be analyzed in order to determine whether they are responsive to a particular inquiry. Questions of the QA pairs may be repetitive and, without more, will not be useful in determining whether their corresponding answer responds to an inquiry.

14 Claims, 2 Drawing Sheets

METHOD AND APPARATUS FOR RESPONDING TO AN INQUIRY

This application is a continuation of prior application Ser. No. 11/260,412, filed Oct. 27, 2005, the disclosures of which is herein incorporated by reference in its entirety.

BACKGROUND OF THE INVENTION

The present invention relates generally to web searching, and more particularly to responding to an inquiry in the form of a natural language query received from a client via a network such as the World Wide Web.

The Internet offers access to an enormous amount of information. Search engines (web sites that enable users to search through the vast number of web pages) have become increasingly sophisticated and better at accessing web pages that meet the user's search criteria. Search engines typically perform their searches based on keywords supplied by a user and returns a ranked list of links to relevant web pages. Even if a user inputs a question to a search engine, the search engine will treat some or all of the words of the question as search keywords to search on. Keywords, however, are not always a good indication of the actual question. Thus, the search engine often does not address what the user specifically asks for. Also, people who are not familiar with how a search engine works may find it harder to select the right keywords.

Furthermore, if a user has a question and poses it to a search engine, the list of web pages provided by the search engine may not answer the question. Typically, the user instead has to read through numerous web pages to locate an answer. Thus, it may be burdensome for a user to determine an answer to a question using these types of search engines.

Question-answering (QA) systems provide an alternative to search engines when a user is trying to determine an answer to a question. These systems accept a question as input and typically output a list of answer candidates or a list of web pages containing the answer. Some of these question-answering systems, however, are company specific and have manually crafted questions and answers. Even more established, general domain question-answering systems (i.e., general, not company specific), which often use web crawlers to search web sites and provide an index of the searched sites for answering questions, are limited in their ability to answer a question. For example, current general domain QA systems are time-insensitive. Thus, a question of "Who is the CEO of company XYZ" would, in theory, imply who is the current CEO of that company. The distinction of time, however, is not clearly encoded in current QA systems. The result of such a query, therefore, may be the most recent CEO that the QA system has stored (which may not, in fact, be the current CEO), may be the first CEO of the company XYZ, or may be any of the CEOs of XYZ.

Other QA systems may use Frequently Asked Questions (FAQs), or QA pairs, to answer an inquiry. FAQs, or QA pairs, are common questions and answers about a particular topic displayed on a web page. The topic may be a product or service. The topic may also be about a particular person or organization. These QA systems conventionally employ a small number of FAQs to answer questions. Thus, the questions and answers are structured because there are a limited number of predefined questions and answers stored in a database. Since these QA systems use a small set of structured QA pairs to answer questions, their question answering ability is limited.

Thus, the current question answering systems are limited in their ability to accurately respond to inquiries.

BRIEF SUMMARY OF THE INVENTION

The present invention provides an improved method and apparatus for responding to an inquiry from a client via a network. Based on the inquiry, question-answer pairs (e.g., FAQs, or QA pairs) retrieved from the network are analyzed to determine a response to the inquiry.

The QA pairs are unstructured, which means that they are retrieved from the network and are not predefined. As a result and as described in more detail below, the QA pairs have to be analyzed in order to determine whether they are responsive to a particular inquiry. Questions of the QA pairs may be repetitive and, without more information, will not be useful in determining whether their corresponding answer responds to an inquiry.

The QA pairs are stored in a database. In one embodiment, the analyzing of the QA pairs includes determining meta-level features of the QA pairs. The meta-level features further include one or more of text, location of the QA pair, relation of one QA pair to one or more other QA pairs, resolution of some pronominal anaphora using preceding QA pairs, and relevant named entities such as a company's name.

In one embodiment, the analysis further includes performing follow-up procedures to determine the response. The follow-up procedures further include displaying multiple responses to the inquiry, enabling a rating of the multiple responses, asking follow-up questions to the inquiry, and/or arriving at the response based on answers (from the client) to multiple responses.

These and other advantages of the invention will be apparent to those of ordinary skill in the art by reference to the following detailed description and the accompanying drawings.

DETAILED DESCRIPTION

Rather than performing a search based on keywords, and rather than responding to an inquiry using a predefined set of frequently asked questions (FAQs) (i.e., question-answer pairs, or QA pairs), the present invention responds to an inquiry received over a network by analyzing QA pairs retrieved over the network, as described in more detail below.

Figure 1:
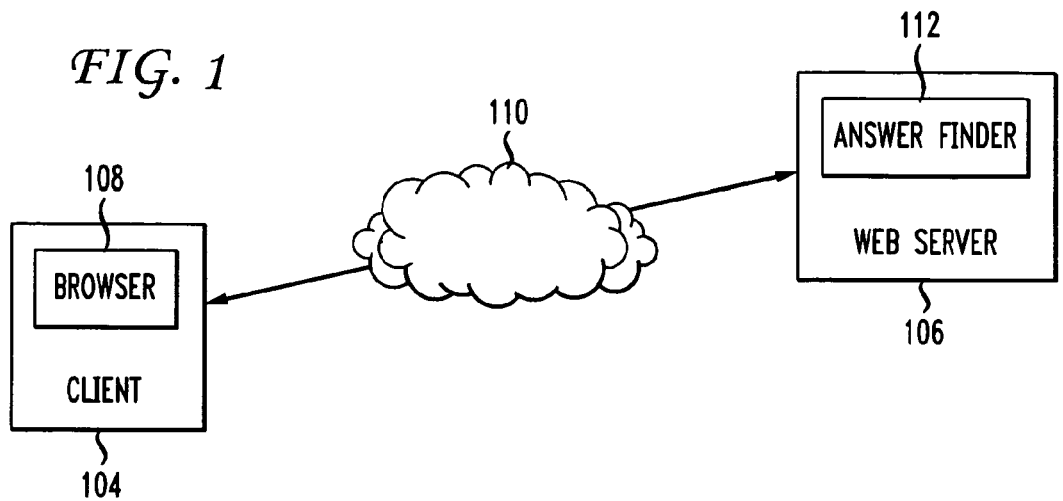
FIG. 1 shows a high level block diagram of a network in accordance with an embodiment of the invention.

FIG. 1 shows a high level block diagram of a network including a client computer (i.e., client) 104 and a web server 106. A user of the client 104 uses web browsing software 108 to access web pages retrieved from the network 110.

The web server 106 includes an answer finder module (i.e., answer finder) 112. The answer finder 112 searches the network 110 for web domains that include web pages having FAQs. The answer finder 112 retrieves the FAQs and stores these FAQs in a database. The QA pairs of the FAQs are unstructured—they are not predefined. Thus, the answer finder 112 does not already know (or generate) what is in the database. Instead, the QA pairs are retrieved from the network 110 (e.g., the World Wide Web) and, therefore, can take any form. Further, the number of QA pairs that are stored is only limited by the storage capacity of the web server 106 (or external storage connected to the web server).

As a result and as described in more detail below, the QA pairs have to be analyzed in order to determine whether they answer a particular inquiry. Specifically, questions of the unstructured QA pairs may be repetitive and, without more information, will not be useful in, determining whether their corresponding answer responds to an inquiry. For example, there may be the same question in a FAQ section of different web sites that ask "How does it work?" Without more, there is typically no way to determine whether this question is useful in determining how to respond to a specific inquiry. Thus, questions may be repeated but answers are typically unique for each question. Therefore, the answer finder 112 has to analyze the QA pairs in order to determine a correct response to an inquiry.

Figure 2:
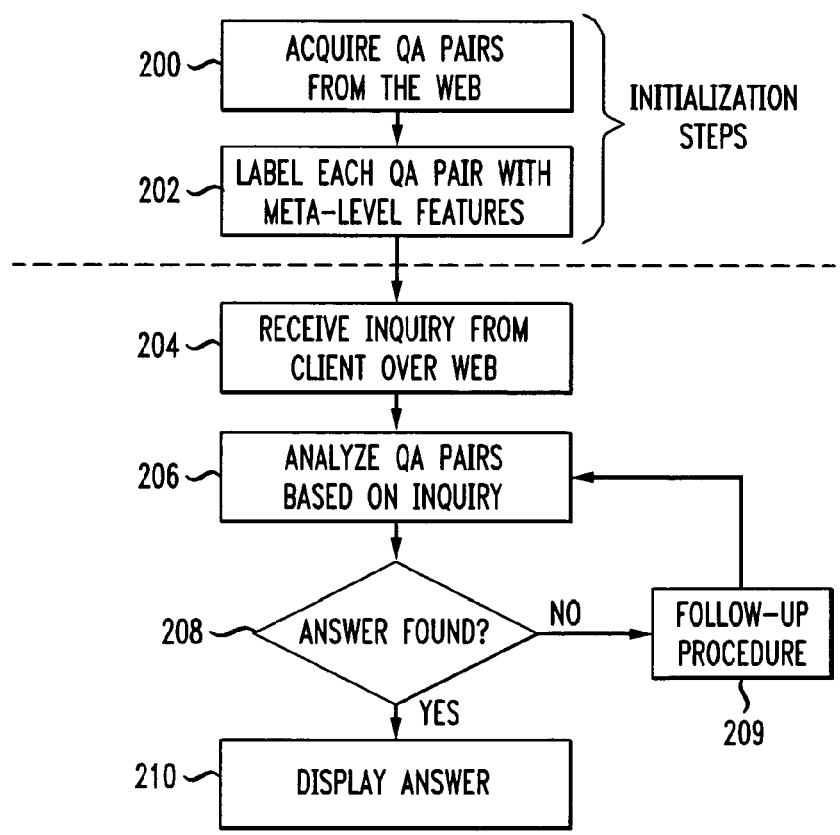
FIG. 2 is a flowchart showing the steps performed by an answer finder to answer an inquiry in accordance with an embodiment of the invention.
Figure 3:
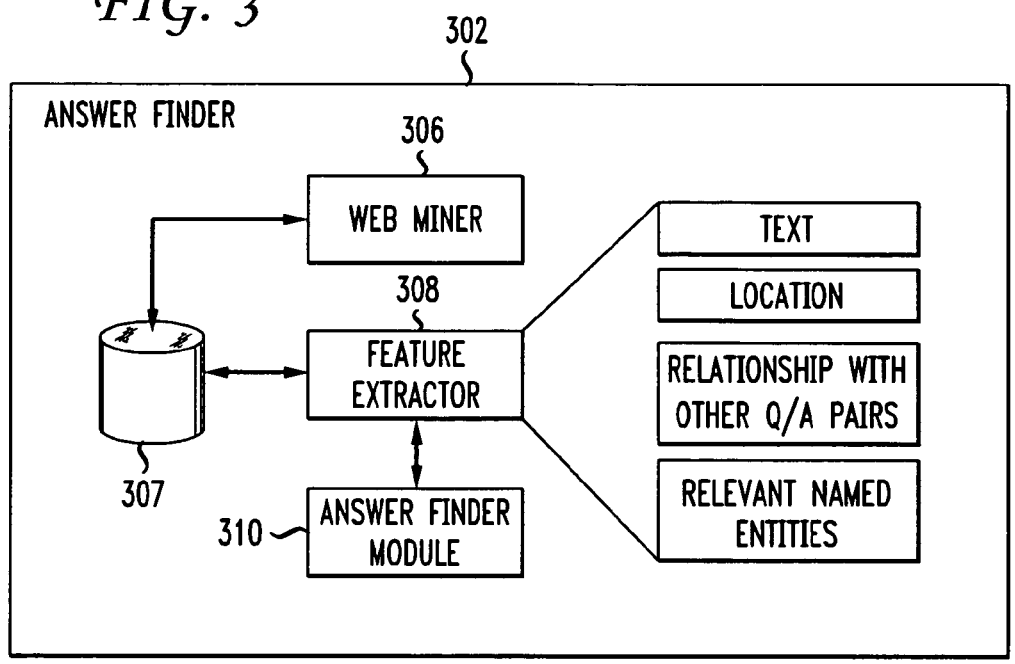
FIG. 3 illustrates a more detailed block diagram of an answer finder in accordance with an embodiment of the invention.

FIG. 2 is a flowchart showing the steps performed by the answer finder to answer an inquiry in accordance with an embodiment of the invention. The answer finder 112 first acquires QA pairs from the web 110 in step 200. As described above, the QA pairs are retrieved from servers within the network 110. Because the QA pairs are unstructured, portions of the QA pairs, such as the questions, may repeat. To provide structure to the QA pairs (and therefore distinguish between the QA pairs), the answer finder 112 labels each QA pair with meta-level features that describe characteristics of the QA pair in step 202. These meta-level features, which are described in more detail below with respect to FIG. 3, are one or more characteristics of the QA pairs. They may vary between QA pairs and may be, for example, the website that the QA pair was retrieved from. Using the same example as described above, if two different QA pairs have the same question of "How Does It Work?", and one QA pair (i.e., FAQ) is from a website relating to computers while the other QA pair is from a website relating to automobiles, the "How Does It Work?" question relating to the first QA pair most likely deals with a computer and the "How Does It Work?" question relating to the second QA pair most likely deals with an automobile. Thus, the answer finder 112 labels each QA pair with a meta-level feature of the corresponding website (i.e., the website that the QA pair is located on) (and perhaps even the subject matter of the website).

As shown in FIG. 2, steps 200 and 202 are initialization steps. These initialization steps may be performed once before the rest of the steps (i.e., steps 204-210) or periodically throughout the process.

The answer finder 112 then receives, in step 204, an inquiry from the client 104 over the web 110. The inquiry (and response) can be in any form (e.g., voice, mouse clicks, typed, etc.) and any language (e.g., Spanish, Chinese, English, etc.). For example, the inquiry may be natural language questions, keyword search patterns, hand written text, spoken utterances, and spoken phrases. The inquiry is analyzed as a natural language query. In one embodiment, the inquiry is analyzed using voice recognition software or handwriting recognition software. The answer finder 112 analyzes QA pairs based on the inquiry in step 206. In particular, the answer finder 112 determines the meta-level features of the QA pairs that were previously assigned to each QA pair. The answer finder 112 then attempts to locate an answer from the stored QA pairs. If no answer is found, the answer finder 112 performs follow-up procedures in step 209.

These follow-up procedures may include asking additional, follow-up questions to obtain more information in order to obtain the correct answer. The follow-up procedures may also include the answer finder 112 displaying multiple answers to the client 104 so that the user can select the answer from the choices. For example, if an inquiry itself is ambiguous, follow-up procedures are needed to clarify the inquiry to obtain an accurate answer. In another embodiment, the answer finder 112 enables a user to rate an answer as being good or bad. The rating can be a word (e.g., excellent, good, moderate, bad, terrible), a number (e.g., 1=excellent . . . 10=terrible), character (e.g., E=excellent . . . T=terrible), or any other indicator. An online learning module may then model the user feedback to improve the system's performance on answering questions. Moreover, even without ratings, if the answer finder 112 displays numerous potential answers and users select one of the numerous answers often (e.g., more than a predetermined number of times), the answer finder 112 can use this information when responding to future inquiries (i.e., thereby providing additional on-line learning). Thus, the answer finder 112 analyzes the inquiry, measures the proximity between the inquiry and the stored questions, and measures the eligibility of the stored answers to be responses for the inquiry.

The communications between the answer finder 112 and the client 104 may be textual-based (e.g., the client types in an inquiry), voice-based (i.e., a user speaks into a microphone and asks a question), or any other adequate input means. Thus, the initial inquiry (and answer) as well as the follow-up procedures may be via text or voice (or any other input means). Based on the follow-up procedures (e.g., one or more follow-up answers to one or more follow-up questions), the answer finder 112 again analyzes the QA pairs to determine a response to the inquiry in step 206. Once an answer is found, the answer finder 112 displays (or speaks, etc.) the answer in step 210.

FIG. 3 illustrates a more detailed block diagram of answer finder 302. The answer finder 302 includes software modules such as a web miner 306, a feature extractor 308, and an answer finder module 310. The web miner 306 is one or more web crawlers that can accurately identify and update QA pairs from the network 110. For example, if new question-answer pairs are entered to a web site, these are downloaded. Additionally, the answer to a question may change over time. In order to deal with inconsistencies due to these changes, the web miner 306 downloads the new answer and saves a timestamp meta-level feature for each QA pair. Thus, when the web miner 306 mines QA pairs from the web, the latest modified date of the web page that the FAQ appears on is retrieved and the date and time are kept as meta-level features of the QA pair.

The web miner 306 browses the network 110 in a methodical, automated manner using well known web-crawling techniques. The web miner 306 is used to create a copy of all the visited pages for later processing (i.e., for later retrieval of QA pairs). The web miner 306 follows one or more of the following policies while crawling web pages: 1) a selection policy that states which pages to download, 2) a re-visit policy that states when to check for changes to the web pages, 3) a politeness policy that states how to avoid overloading websites by visiting or crawling the same websites too frequently, and 4) a parallelization policy that states how to coordinate distributed web crawlers of the web miner 306.

Specifically, the web miner 306 detects if a given web page contains one or more questions using language processing (LP) techniques. For example, a question usually ends with a question mark and begins with a question word such as "who", "what", etc. The web miner 306 analyzes the stylistic and linguistic features of each sentence on the web page to determine if the sentence is a question. In one embodiment, the web miner 306 uses linguistic text pre-processing to tag the question-answer pairs, such as part of speech tagging, name entities extraction, question classification, FAQ context determination which determines semantic context among question answer pairs from the same website, etc.

The web miner 306 then detects FAQ templates. In particular, there exists several typical FAQ page templates, which a web page developer may use to encode his web page. If a web page with questions is identified with these templates, the web miner 306 locates the QA pairs based on these known template structures. For FAQ pages having multiple questions that do not use any template, the web miner 306 detects the semantic blocks that are encoded with similar layout properties. The web miner 306 detects the semantic blocks that are encoded with similar layout properties because QA pairs on the same web page tend to have similar presentation structures. Each of these semantic blocks is a QA pair candidate starting with a question. In one embodiment, the web miner 306 then determines the presentation properties of these semantic blocks, e.g., by capturing objects surrounding the QA block, separators between the question and associated answer, as well as the HTML tags or attributes used inside the QA pair. For FAQ pages with only one QA pair, the web miner 306 can detect candidate QA blocks by checking their layout similarity with QAs on other QA pages of the same site (i.e., most web sites often maintain a consistent style to their design of their QA pages).

The web miner 306 stores the QA pairs in database 307. It is noted that database 307 is shown as an internal component of the answer finder 302. However, in various alternative embodiments, the database 307 may be an external device connected to the answer finder 302 (e.g., the web miner 306), or may be a stand-alone network node which the answer finder 302 accesses via a network interface.

Once the web miner 306 obtains QA pairs and stores them in the database 307, the feature extractor 308 extracts the QA pairs from the database 307 and labels each QA pair with one or more corresponding meta-level feature. These meta-level features may include a description of the actual text of the QA pair, the location of the QA pair (e.g., the web page, the location on the web page (e.g., in the sports section of the web page), etc.), and/or relationship with other QA pairs on the web site (e.g., does this QA pair follow another, related QA pair and, if so, what is the first (i.e., related) QA pair?). The meta-level features may also include relevant named entities (e.g., does the QA pair mention another entity that is relevant, such as another web page, a person's name, a company's name, a location, time of the information, etc.?).

The feature extractor 308 further normalizes the QA pairs. Normalization of a QA pair occurs when the feature extractor 308 uses the meta-level features of each QA pair to define relationships among QA pairs. QA pairs are normalized because QA pairs exist in series (i.e., not in isolation). References must be recognized. For example, if a first QA pair refers to the first President of the United States and a second QA pair refers to George Washington, the feature extractor 308 recognizes that the phrase and name refer to the same person. This can also include the resolution of the reference information for pronominal anaphora (e.g., the pronoun "he" in one question may be referring to a noun such as "the first President", in a previous question or answer). The feature extractor 308 denotes this in the features associated with each QA pair, which can then be used during its analysis for an answer.

To answer the inquiry, an answer finder module 310 analyzes the unstructured QA pairs with their corresponding meta-level features to determine one or more potential responses to the inquiry. If the answer finder module 310 determines several potential responses to the inquiry, then the answer finder module 310 has to perform follow-up procedures, as described above.

Figure 4:
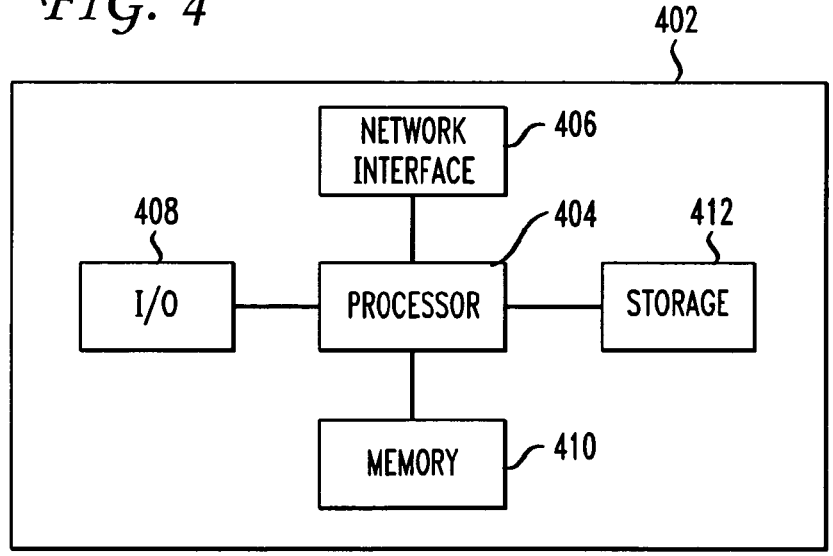
FIG. 4 is a high level block diagram of a computer implementation of an answer finder in accordance with an embodiment of the invention.

A high level block diagram of a computer implementation of server 402 is shown in FIG. 4. Server 402 contains a processor 404 which controls the overall operation of the computer by executing computer program instructions which define such operation. The computer program instructions may be stored in a storage device 412 (e.g., magnetic disk) and loaded into memory 410 when execution of the computer program instructions is desired. Thus, the answer finder operation will be defined by computer program instructions stored in memory 410 and/or storage 412 and the computer will be controlled by processor 404 executing the computer program instructions. Computer 402 also includes one or more network interfaces 406 for communicating with other devices via a network. Server 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for responding to an inquiry comprising:
   generating question and answer pairs based on a comparison of a first layout associated with a first web page and a second layout associated with a second web page;
   identifying meta-level features of the question and answer pairs, wherein meta-level features of a particular question and answer pair are based on meta-level features of a related question and answer pair;
   receiving an inquiry from a user;
   determining, by a processor, a plurality of responses to the inquiry based on analysis of meta-level features of the question and answer pairs, the analysis of meta-level features comprising:
      linguistic pre-processing of a specific question and answer pair to generate a linguistic tag; and
      associating the linguistic tag with the specific question and answer pair;
   presenting the plurality of responses to the user;
   receiving an input identifying a selection of a particular response from among the plurality of responses;

updating a measure of eligibility of the particular response to be a response to the inquiry in response to the selection of the particular response.

2. The method of claim 1 further comprising:

generating a follow-up question based on the inquiry from the user; and clarifying the inquiry from the user based on a response to the follow-up question.

3. The method of claim 2 wherein the determining a plurality of responses to the inquiry is further based on the clarifying the inquiry from the user.

4. The method of claim 1 wherein the question and answer pairs are unstructured question and answer pairs.

5. The method of claim 1 wherein meta-level features of a particular question and answer pair comprise a location of the particular question and answer pair, a resolution of a pronomial anaphora using preceding question and answer pairs, and relevant named entities.

6. An apparatus for responding to an inquiry, the apparatus comprising:

a processor; and a memory to store computer program instructions, the computer program instructions when executed on the processor cause the processor to perform operations comprising:

generating question and answer pairs based on a comparison of a first layout associated with a first web page and a second layout associated with a second web page;

identifying meta-level features of the question and answer pairs, wherein meta-level features of a particular question and answer pair are based on meta-level features of a related question and answer pair;

receiving an inquiry from a user;

determining a plurality of responses to the inquiry based on analysis of meta-level features of the question and answer pairs, the analysis of meta-level features comprising:

linguistic pre-processing of a specific question and answer pair to generate a linguistic tag; and associating the linguistic tag with the specific question and answer pair;

presenting the plurality of responses to the user;

receiving an input identifying a selection of a particular response from among the plurality of responses;

updating a measure of eligibility of the particular response to be a response to the inquiry in response to the selection of the particular response.

7. The apparatus of claim 6, the operations further comprising:

generating a follow-up question based on the inquiry from the user; and clarifying the inquiry from the user based on a response to the follow-up question.

8. The apparatus of claim 7 wherein the determining a plurality of responses to the inquiry is further based on the clarifying the inquiry from the user.

9. The apparatus of claim 6 wherein the question and answer pairs are unstructured question and answer pairs.

10. The apparatus of claim 6 wherein meta-level features of a particular question and answer pair comprise a location of the particular question and answer pair, a resolution of a pronomial anaphora using preceding question and answer pairs, and relevant named entities.

11. A computer readable storage device storing computer program instructions for responding to an inquiry, which, when executed on a processor, cause the processor to perform operations comprising:

generating question and answer pairs based on a comparison of a first layout associated with a first web page and a second layout associated with a second web page;

identifying meta-level features of the question and answer pairs, wherein meta-level features of a particular question and answer pair are based on meta-level features of a related question and answer pair;

receiving an inquiry from a user;

determining a plurality of responses to the inquiry based on analysis of meta-level features of the question and answer pairs, the analysis of meta-level features comprising:

linguistic pre-processing of a specific question and answer pair to generate a linguistic tag; and associating the linguistic tag with the specific question and answer pair;

presenting the plurality of responses to the user;

receiving an input identifying a selection of a particular response from among the plurality of responses;

updating a measure of eligibility of the particular response to be a response to the inquiry in response to the selection of the particular response.

12. The computer readable storage device of claim 11, the operations further comprising:

generating a follow-up question based on the inquiry from the user; and clarifying the inquiry from the user based on a response to the follow-up question.

13. The computer storage device medium of claim 12 wherein the determining a plurality of responses to the inquiry is further based on the clarifying the inquiry from the user.

14. The computer readable storage device of claim 11 wherein the question and answer pairs are unstructured question and answer pairs.

* * * * *